Apr. 24, 1923.
1,452,562
C. A. KRAUSS
BAIL FOR RECEPTACLES
Filed Aug. 22, 1921
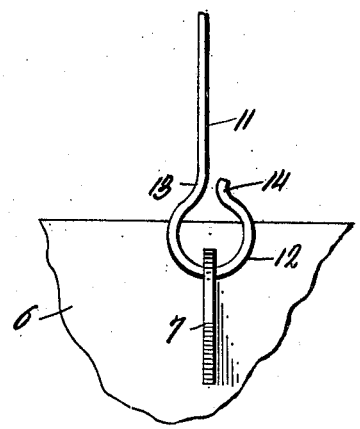
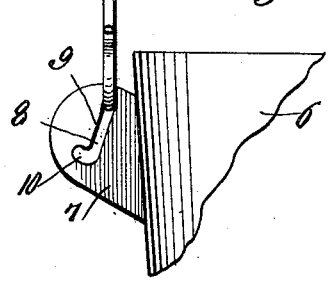
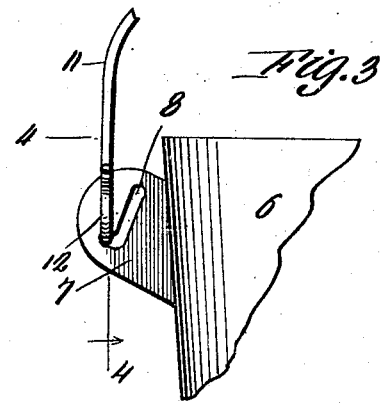
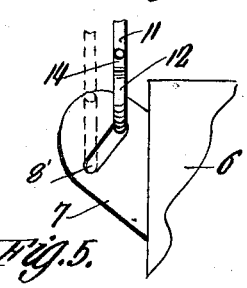
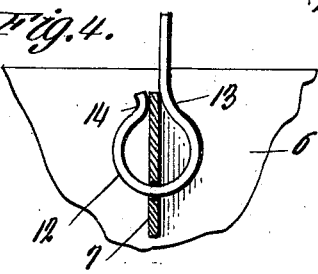
WITNESSES
CHARLES A. KRAUSS  INVENTOR.
BY
ATTORNEY.

Patented Apr. 24, 1923.

1,452,562

UNITED STATES PATENT OFFICE.

CHARLES A. KRAUSS, OF PHILADELPHIA, PENNSYLVANIA.

BAIL FOR RECEPTACLES.

Application filed August 22, 1921. Serial No. 494,253.

*To all whom it may concern:*

Be it known that I, CHARLES A. KRAUSS, a citizen of the United States, residing at Philadelphia, in the county of Philadelphia and State of Pennsylvania, have invented certain new and useful Improvements in Bails for Receptacles, of which the following is a specification.

This invention relates to new and useful improvements in receptacles and more particularly to means whereby the bails thereof may be retained in upright position when desired, the present invention being designed to improve and simplify the construction disclosed in my Patent 1,368,508 granted Feb. 16, 1921.

The principal object of the invention is to provide novel bail carrying ears for a receptacle which will co-act with a bail of substantially standard construction in a manner whereby the bail may be retained in an upright position, or when desired may be swung from side to side in the usual manner. More particularly, the invention resides in slotting the bail carrying ears of a receptacle in a particular manner for the reception of loops formed at the ends of the bail whereby portions of the loops at times will abut the ears to retain the bail in upright position and prevent it from accidental displacement from said position; said bail being movably associated with the ears due to the slots therein so that the bail may be swung when desired from one side of the receptacle to the other.

Other objects and advantages of the invention will become apparent during the course of the following description.

In the accompanying drawing forming a part of the application and wherein like numerals are employed to designate like parts throughout the several views, Figure 1 is an elevation of the invention showing it applied to a portion of a receptacle, the bail carrying ears being shown from an edge view.

Figure 2 is a similar view showing the bail carrying ear in side elevation with a portion of a bail associated therewith in a position to swing from one side of the receptacle to the other.

Figure 3 is a similar view showing the portion of the bail associated with the ears so that the bail will be retained in an upright position.

Figure 4 is a vertical section on the line 5—5 of Figure 3, and

Figure 5 is a fragmentary elevation of a receptacle showing a modified form of ear applied thereto.

In the accompanying drawing wherein is shown the preferred embodiments of my invention, the numeral 6 designates a portion of a receptacle which may be of the culinary metal type, bucket type, and in fact any kind of receptacle with which a bail is associated. A pair of bail carrying ears 7 extend laterally from the receptacle at diametrically opposite points in the customary manner, and it is to be understood that the ears may be fastened to the receptacle by any desired means.

In the form of invention illustrated in Figures 1, 2, 3 and 4, each ear 7 is provided with an elongated tortuous slot 8, the major portion 9 of which is elongated and inclined downwardly and outwardly of the receptacle as clearly seen in Figure 2. The relative lower end 10 of each slot is extended outwardly of the receptacle and angularly with relation to the major portion of the slot so that a substantially L-shaped slot is provided in each ear. It will of course be obvious that instead of extending the lower end of the slot in the manner mentioned herein, the outer longitudinal edge of the slot at its lower end may be simply notched to provide the necessary pocket.

The purpose of inclining the slot from a perpendicular line, is to provide a solid portion of the ear directly above the lower end of the slot for a purpose which will now appear. One end of any type of yieldable bail is indicated by the numeral 11 and it will be understood that the free ends of the bail are each formed into a loop 12 of substantially standard construction and which has its throat portion 13 opening upwardly. As best seen in Figures 1 and 4, the free end 14 of each loop is bent to be arranged in approximately parallel relationship to the bail and normally spaced therefrom a distance less than the thickness of the ears 7. As the bail is constructed from resilient material, it will be obvious that the free ends 14 of the loops 12 may move relative to the bail to vary the size of the loop throats 13.

The loops 12 of the bail are passed through the slots 8 in the well known manner and are normally engaged with the upper ends of the slots 8 in the ears whereby the bail may swing from one side of the receptacle to the other in the ordinary manner. When the bail is in this position it will be seen that the throat of each loop is disposed above its respective ear 7 and consequently the bail may swing freely. However, when it is desired to retain the bail in an upright position, it is moved to approximately a perpendicular position and a slight downward pressure is exerted thereon to cause the loops 12 to slide to the bottom of the inclined slots 9. Upon reaching the bottoms of these slots, the loops will swing outwardly due to the resiliency of the bail and the lowermost portions of the loops will be received in the angular portion 10 of the slots. When the loops assume this position, it will be seen that the throats of the loops will receive and frictionally engage opposite sides of solid portions of the ears to form abutments so that the bail will be maintained in an upright position. Due to the fact that the lower portions of the loops will be maintained in the angular lower ends of the slots, it will be appreciated that the bail cannot be accidentally jarred to make it fall to the side of the receptacle from its upright position. However, when it is desired to have the bail swing, it is lifted so that its loops are withdrawn from the angular portions of the slots and into the upper ends of the slots whereby the free ends 14 of the loops will not abut the ears.

In Figure 5 is seen a slightly modified form of slot 8′, the ears 7 and bail being identically the same as disclosed in the preceding form of invention. The slot 8′ inclines downwardly and outwardly of the receptacle and is elongated. In this form, it will be noted that the slot is inclined at a greater angle from the perpendicular so that when the loops 12 are associated with the lower ends of the slots 8′, the bail cannot be accidentally displaced from its upright position. I do not care to restrict myself to the fact that the slots incline downwardly and outwardly of the receptacle, for obviously they may incline in the opposite direction and may be of many other shapes which would not fall beyond the scope of the invention. However, the types of slots illustrated therein are deemed preferable at present.

The foregoing description and accompanying drawings have reference to what might be considered to be the approved or preferred form of my invention. I desire it to be understood that I may make such changes in the construction, combination and arrangement of parts material, dimensions, etc. as may prove expedient and fall within the scope of the appended claims.

Having thus described my invention what I claim as new and desire to secure by Letters Patent, is:

1. In combination, a receptacle having a bail receiving ear, said ear including a straight vertically disposed radially extending body portion having an elongated way therein arranged at an angle to the horizontal, and a bail having a depending substantial annular loop provided with an upper restricted open throat, said loop being slidably associated with the way to permit the loop to move downward on the ear, whereby the open restricted throat portion of the loop is permitted to frictionally engage the upper end of the ear.

2. In combination, a receptacle having a bail receiving ear, said ear including a straight vertically disposed radially extending body having an elongated way therein disposed at an acute angle to the vertical, and a flexible bail having a depending substantial annular loop provided with an upper restricted throat, said loop being slidably associated with the way to permit the loop to move downward and laterally of the ear, whereby the open restricted throat portion of the loop is permitted to frictionally engage the upper end of the ear.

3. In combination, a receptacle having a bail receiving ear, said ear including a straight vertically disposed radially extending body portion having an elongated way therein disposed at an acute angle to the vertical, said way inclining downwardly and outwardly from the receptacle, the ear at the lower end of the way being provided with a laterally extending notch and a bail having a depending loop provided with an upper restricted open throat, said loop being slidably associated with the way to permit the loop to be moved downward on the ear in engagement with the notch and to permit the open restricted throat portion of the loop to frictionally engage the upper edge of the ear.

4. A device of the character described including a receptacle having ears provided with elongated slots inclined outwardly and downwardly of the receptacle, and a bail having its ends normally expansible outwardly of the receptacle and provided with open ended loops equipped with throat portions associated with said slots, said throat portions being adapted to engage solid portions of the ears when the loops are disposed in the lower ends of said slots and normally held in the lower ends of said slots by the resiliency of the bail.

In testimony whereof I affix my signature in presence of two witnesses.

CHARLES A. KRAUSS.

Witnesses:
C. FRANK AYER,
WILLIAM K. KRAUSS.